(12) United States Patent
Bora (10) Patent No.: US 10,210,059 B1
(45) Date of Patent: Feb. 19, 2019

(54) IO WORKLOAD SELECTION AND PRIORITIZATION IN DATA MIRRORING ENVIRONMENTS

(71) Applicant: EMC IP Holding Company LLC, Hopkinton, MA (US)

(72) Inventor: Bhaskar Bora, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/797,739

(22) Filed: Oct. 30, 2017

(51) Int. Cl.
*G06F 3/06* (2006.01)
*G06F 11/20* (2006.01)
*G06F 11/34* (2006.01)
*G06F 11/30* (2006.01)

(52) U.S. Cl.
CPC ........ *G06F 11/2066* (2013.01); *G06F 3/0619* (2013.01); *G06F 3/0665* (2013.01); *G06F 3/0689* (2013.01); *G06F 11/2058* (2013.01); *G06F 11/3034* (2013.01); *G06F 11/3433* (2013.01)

(58) Field of Classification Search
None
See application file for complete search history.

(56) References Cited

U.S. PATENT DOCUMENTS

| | | |
|---|---|---|
| 8,990,453 B1 | 3/2015 | Bora et al. |
| 9,229,638 B1 | 1/2016 | Bora et al. |
| 9,652,414 B1 | 5/2017 | Bhatnagar et al. |
| 9,665,307 B1 | 5/2017 | LeCrone et al. |

*Primary Examiner* — Kevin Verbrugge
(74) *Attorney, Agent, or Firm* — Anderson Gorecki LLP (57) ABSTRACT

A method of IO workload selection and prioritization in data mirroring environments includes setting a first weight, a second weight, and a third weight to be used during an iteration of IO processing. The method further includes processing IOs of a first class of IO operations while there are IOs of the first class of IO operations to be processed and while a first weight for the first class of IO operations is positive, processing IOs of a second class of IO operations while there are IOs of the second class of IO operations to be processed and while a second weight for the second class of IO operations is positive, processing IOs of a third class of IO operations while there are IOs of the third class of IO operations to be processed and while a third weight for the third class of IO operations is positive.

19 Claims, 6 Drawing Sheets

600: Round Trip Time using randomized interleaved workflow
610: Round Trip Time using ordered IO workflow processing

FIG. 6B

IO WORKLOAD SELECTION AND PRIORITIZATION IN DATA MIRRORING ENVIRONMENTS

BACKGROUND

Networked storage arrays can be used to maintain copies of data on different devices in different locations. Such mirroring of data is useful for various reasons including reducing the likelihood of catastrophic data loss. In order to mirror production or primary (source) site data to a secondary (target) site, a primary storage array (R1) is configured in a partner relationship with one or more remote storage arrays (R2). The set of storage devices that are configured to mirror data with each other will be referred to herein as a "Remote Data Facility". A given storage device may be a member of multiple remote data facilities, which may use different methods of copying data. This disclosure relates to computing systems and related devices and methods, and, more particularly, to IO workload selection and prioritization in data mirroring environments.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

A method of IO workload selection and prioritization in data mirroring environments includes setting a first weight, a second weight, and a third weight to be used during an iteration of IO processing. The method further includes processing IOs of a first class of IO operations while there are IOs of the first class of IO operations to be processed and while a first weight for the first class of IO operations is positive, processing IOs of a second class of IO operations while there are IOs of the second class of IO operations to be processed and while a second weight for the second class of IO operations is positive, processing IOs of a third class of IO operations while there are IOs of the third class of IO operations to be processed and while a third weight for the third class of IO operations is positive.

DETAILED DESCRIPTION

This disclosure is based, at least in part, on the realization that it would be advantageous to improve IO workload selection and prioritization in data mirroring environments.

Various aspects of the invention may be implemented partially or completely using computer program code. The computer program code is stored on non-transitory computer-readable memory and utilized by processing hardware. The program code may be provided as a computer program product or be integrated into network equipment. In some implementations, various aspects of the invention can be used by the operating system of a storage system to select IOs for processing by one or more CPUs under the control of the operating system.

Host processor systems may store and retrieve data using a storage device containing a plurality of host interface units (host adapters), disk drives, and disk interface units (disk adapters). Such storage devices are provided, for example, by Dell EMC™. The host systems access the storage device through a plurality of channels provided therewith. Host systems provide data and access control information through the channels to the storage device, and the storage device provides data to the host systems also through the channels. The host systems do not address the disk drives of the storage device directly, but rather, access what appears to the host systems as a plurality of logical disk units. The logical disk units may or may not correspond to the actual disk drives.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by a Remote Data Facility (RDF) product, such as a Symmetrix™ Remote Data Facility (SRDF) product, provided by Dell EMC™.

Figure 1:
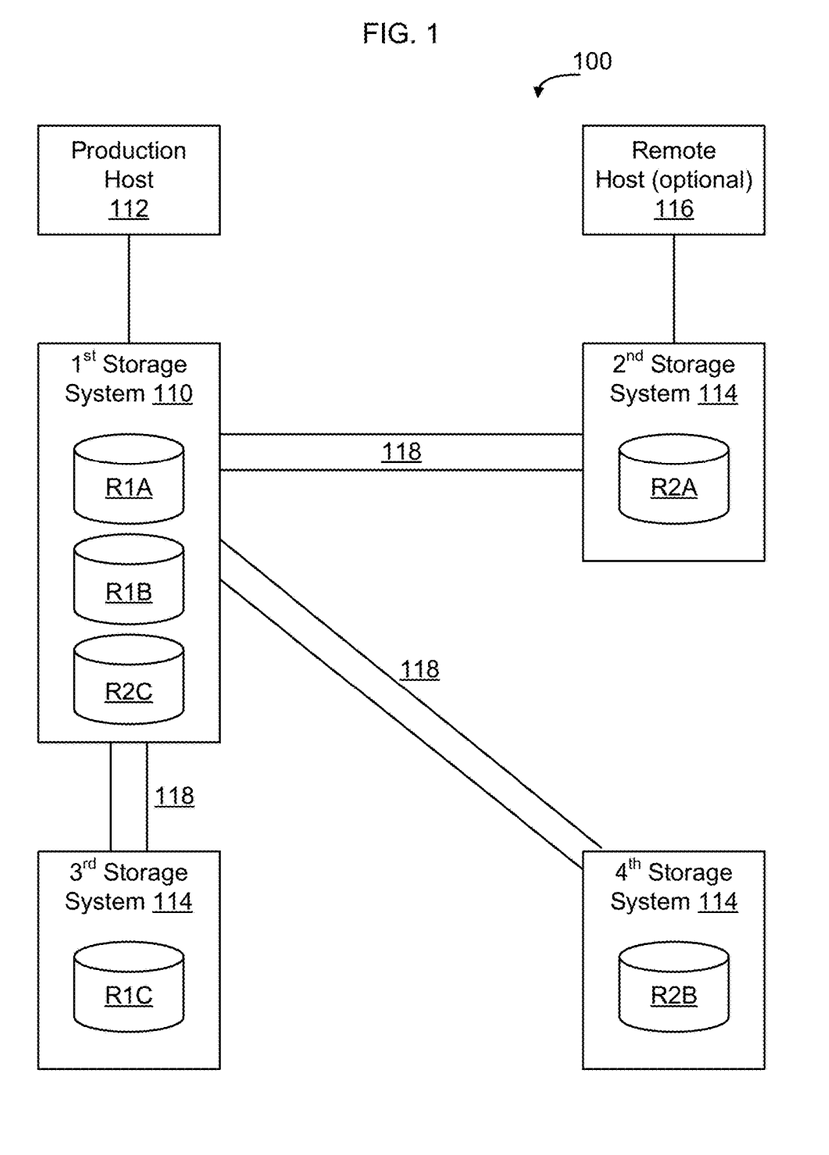
FIG. 1 is a functional block diagram of an example storage environment configured to provide a mirroring environment according to an embodiment.

FIG. 1 shows an example networked storage system 100 configured to implement one or more Remote Data Facilities in a data mirroring environment. As shown in FIG. 1, each remote data facility includes a first storage device 110, denoted as the "primary storage device" (or "R1"), that is coupled to a production host 112. The production host generates the data that is to be stored in the first storage device and which will be replicated on the remote data facility. One or more second storage devices 114, called "secondary storage devices" (or "R2"), receive copies of the data on the remote data facility to enable a copy of the data to be stored on more than one storage device. Optionally a remote host 116 may connect to secondary storage device 114 to access (read only) data stored on secondary storage device 114.

FIG. 1 shows an example where the first storage system 110 is participating as a primary (R1) storage device on two remote data facilities. Specifically, primary storage device R1A is the primary storage device on a first remote data facility that is paired with secondary storage device R2A. Primary storage device R1B is the primary storage device on a second remote data facility that is paired with secondary storage device R2B. First storage system is also a secondary storage device R2C on a third remote data facility that is paired with primary storage device R1C. Thus, a given storage system may simultaneously participate as a primary R1 storage device on some remote data facilities and as a secondary R2 storage device on other remote data facilities. Although the example shown in FIG. 1 shows an implementation of RDF using a single R1 and R2 pair, in other embodiments the RDF topology mirroring may be more complex, involving multiple R1 devices, multiple R2 devices and/or devices operating as both R1 and R2 devices. The IO workload selection and prioritization methods described herein may be used in any of these RDF topologies and is not limited to the example RDF topology illustrated in FIG. 1.

As noted above, the production host 112 reads/writes data to the primary R1 storage device, and any data changes made to the primary R1 storage device are automatically provided to the one or more secondary R2 storage devices on the remote data facility. The primary and secondary storage devices may be connected by one or more data duplication links 118, such as ESCON links, Fibre Channel links, and/or Gigabit Ethernet links, or other communication network interconnections.

Data transfer among storage devices, including transfers for data replication or mirroring functions, may take place in several ways depending on how the primary storage device handles data written by the host and how the secondary storage device acknowledges receipt of data on the remote data facility. Several example data mirroring modes will be referred to herein as synchronous (SYNC), asynchronous (ASYNC), and adaptive copy (ADP).

In a synchronous data mirroring mode, data is transmitted from R1 to R2 as the data is received from the production host 112, and an acknowledgement of a successful write is transmitted by R2 synchronously with the completion thereof. To maintain a synchronous relationship between R1 and R2, each IO from the production host 112 is forwarded by R1 to R2 as it is received from production host 112, and R1 will wait for the acknowledgment from R2 prior to issuing a subsequent 10. Since the IOs happen based on the data writes from the production host 112, the IOs can vary greatly in size, from small IOs on the order of 0.5 KB, to larger IOs that can be up to a maximum data transmission unit size of, for example, on the order of 128 KB.

In an asynchronous data mirroring mode, when data is received from the production host 112, the data will be written to primary storage device and a data transfer process will be initiated to write the data to the secondary storage device on the remote data facility. The primary storage device will acknowledge the write to the production host 112 before the primary storage device has received an acknowledgement that the data has been received by the secondary storage device. Although the use of asynchronous data mirroring does enable the data on the primary and secondary storage devices to be one or more cycles out of synchronization, asynchronous transfers may be beneficial in connection with sites located geographically distant from each other. For example, it may be preferable to use asynchronous data transfer modes where the distance between the R1 and R2 devices is such that waiting for an acknowledgement from the secondary storage device would take considerable time and, hence, reduce responsiveness of the primary storage device to production host 112. Asynchronous IOs, like synchronous IOs, may vary in size for example from 0.5 KB to 128 KB. However, asynchronous IOs often result in transmission of data from the primary storage device to the secondary storage device that is of the maximum data transmission unit size.

An adaptive copy data mirroring mode operates by accumulating changes in cache in the primary R1 storage device. As changes to the data are received from the production host 112, the data is written to cache and the data IOs are immediately acknowledged to the production host. The data is written by the storage system to the primary R1 storage device. Once a sufficiently large quantity of data changes have accumulated, the adaptive copy data mirroring mode will cause the accumulated changes to be written to the corresponding secondary R2 storage device of the remote data facility. The adaptive copy mode of data mirroring exhibits a fast application response time because it returns a positive acknowledgment to the production host 12 as soon as data is written to cache in the primary system. This mode is also effective at moving large amounts of data with minimal host impact, for example to synchronize the new device pairs when a new remote data facility is created to protect the data of the production host 112. Because adaptive copy mode allows the R1 and R2 devices to be more than one write IO out of synchronization, adaptive copy mode may not provide a restartable data image at the secondary site and thus is not designed for disaster restart solutions.

As noted above, a given storage device 110 may be a participant in multiple remote data facilities. Each of these remote data facilities will use one or more of the SYNC, ASYNC, and/or ADP data mirroring modes. This means that the CPUs on the first storage device need to handle IO workloads of varying types. According to an implementation, an IO workload selection and prioritization process is provided for enabling workload selection and prioritization in a data mirroring environment. Embodiments enable IO workload selection where a processor of a storage device 110 is handling SYNC IO, ASYNC IO, and ADP (adaptive copy) IO operations, and enable prioritization between the various IO workloads.

Movement of data between the R1 and R2 devices is accomplished with exchanges known as IOs. For example, Read and Write operations are types of IOs. IO requests on the R1 device are queued before they are taken up for transmission to the R2 device. The time required to complete IOs is a function of primary and secondary site load, the transfer length of the IO, the type of IO, and physical distance between the primary and secondary sites. Generally, aspects of the invention control IO request transmission (release) at the R1 device to achieve enhanced throughput, e.g., in terms of network bandwidth and IOs/second (IOPS). The IOPS will translate to the host response rate which typically is used to gauge performance of a storage system. It will therefore be appreciated that aspects of the invention together help to achieve optimal IO response with maximum network throughput.

In some implementations, a given storage device 110 will be provided with a set of priorities that specify the proportion of physical resources that should be used by the storage device 110 to process IO workload of the various data mirroring mode types. Example physical resources may include CPU processor time, network bandwidth on links 118, or other physical resources. For example, the first storage device may be provided with a set of priorities that specify that the first storage device should use 70% of its resources to process SYNC IO workload, 20% of its resources to process ASYNC IO workload, and 10% of its resources to process ADP workload. Other ratios may be specified in as priorities depending on the implementation.

Figure 2:
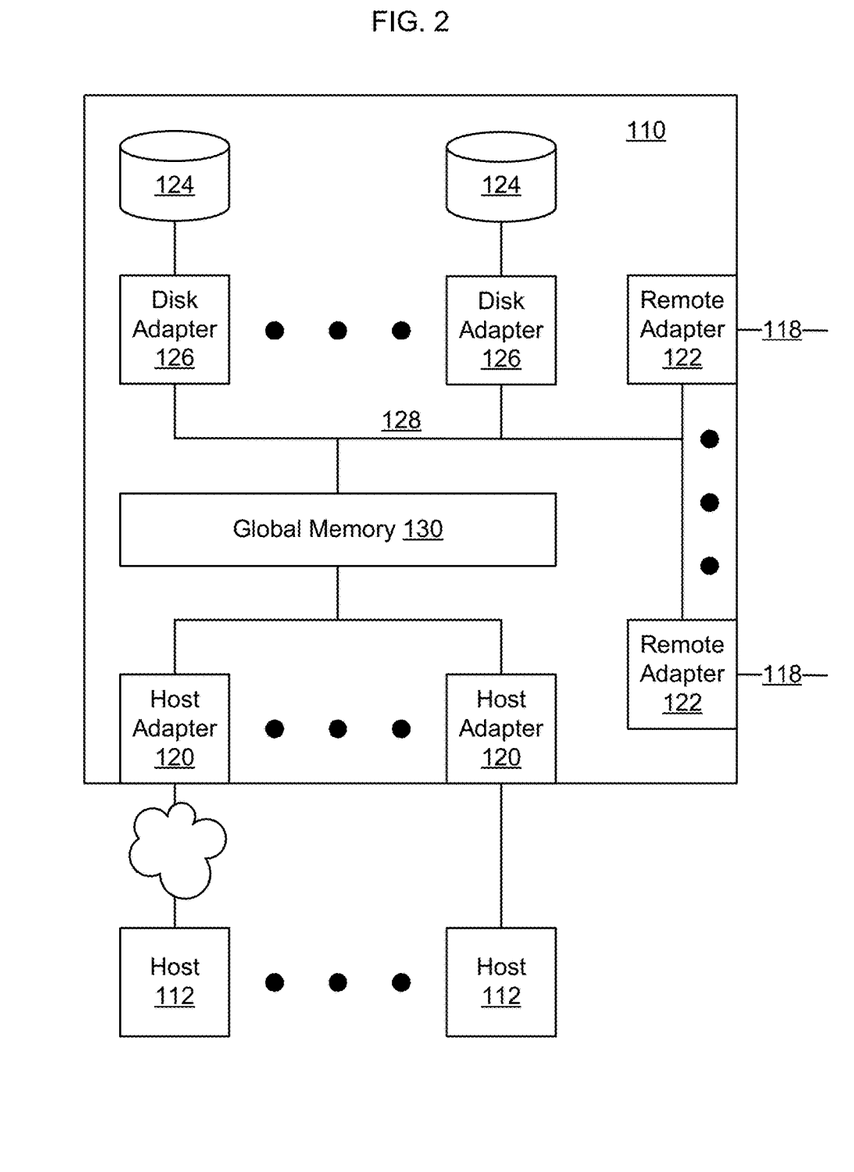
FIG. 2 is a functional block diagram of an example storage system for use in the mirroring environment of FIG. 1 according to an embodiment.

FIG. 2 is a functional block diagram of an example storage device 110. As shown in FIG. 2, production host 112 reads and writes data from and to the first storage device 110 via host adapter 120, which facilitates the interface between the production host 112 and the first storage device 110. It will be appreciated by one of ordinary skill in the art that the storage device 110 may include multiple host adapters 120 to connect with multiple hosts 112. Likewise, each host adapter 120 may connect to one or more hosts 112.

The storage device 110 may include one or more remote adapters 122 connected to data duplication links 118. The remote adapters 122 are similar to the host adapters 120, but are used to transfer data between storage devices, for example to transfer data to the secondary storage device on a remote data facility. In some embodiments, the software used in connection with IO workload selection and prioritization in data mirroring environments operates within the remote adapters 122, as discussed in greater detail herein to select and prioritize IO workload of the several types for processing in the data mirroring environment.

The storage device 110 may include one or more disks 124, each obtaining a different portion of data stored on the storage device 110. Subsets of the data stored on disks 124 is copied on the one or more remote data facilities to enable separate portions of the data to be separately mirrored via remote data facilities within the data mirroring environment.

Each of the disks 124 is coupled to a corresponding disk adapter 126 that provides data to a corresponding one of the disks and receives data from a corresponding one of the disks. It is possible for more than one disk to be serviced by a disk adapter, and likewise it is possible for more than one disk adapter to service a disk 124. The term "disk" as used herein, includes disk drives having internal moving (spinning) storage mediums as well as solid state drives without moving (spinning) storage mediums. An internal data path 128 exists between the disk adapters 126, the host adapters 120, and the remote adapters 122 of the first storage device 110. The storage device 110 also includes a global memory 130 that may be used to facilitate data transfers between the disk adapters 126, the host adapters 120, and the remote adapters 122. The global memory may also be used to cache data for transfer on a remote data facility, for example in connection with an adaptive copy data mirroring mode of data transfer.

Figure 3:
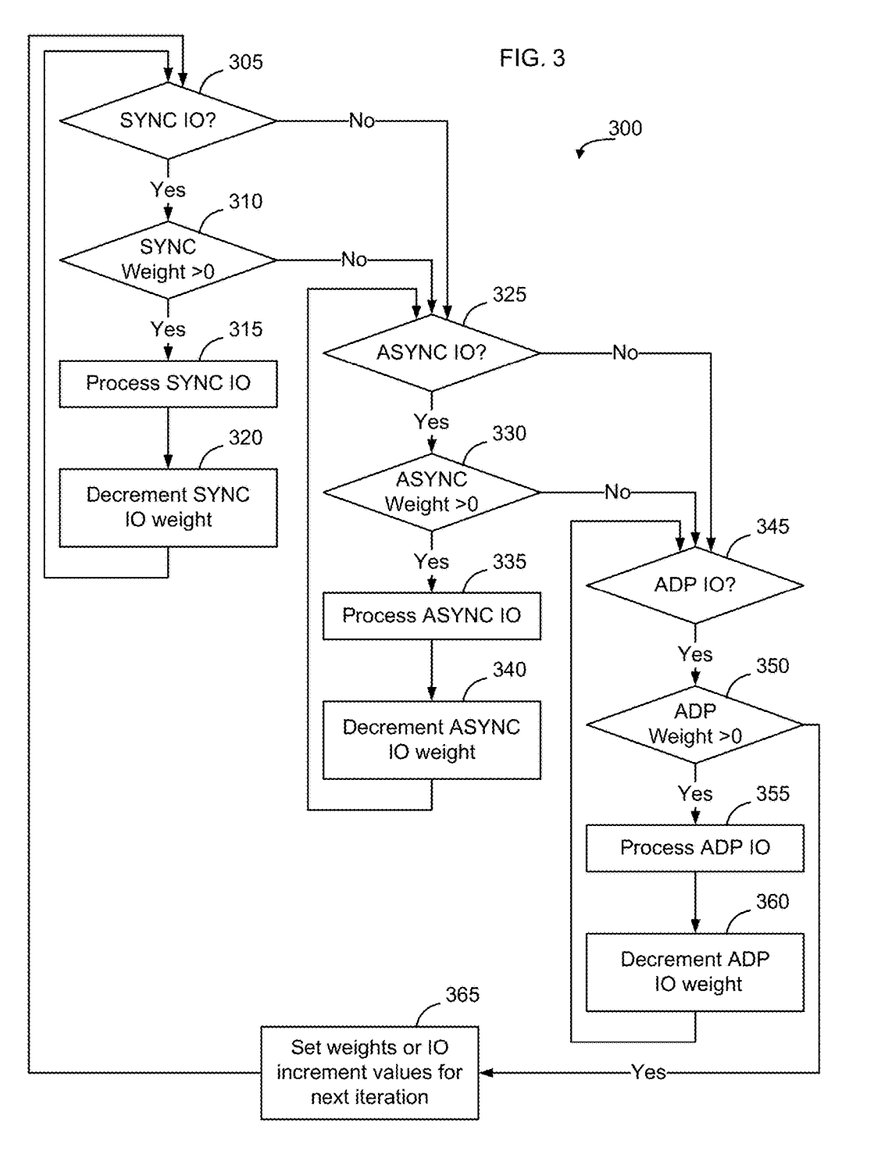
FIG. 3 is a flow chart showing an example method of IO workload selection and prioritization in a data mirroring environment according to an embodiment.

FIG. 3 shows an example IO workload selection and prioritization process optimized for use in data mirroring environments. As shown in FIG. 3, the algorithm strives to allocate bandwidth as per a predetermined set ratio, for example to use 70% of the physical resources to process SYCN IOs, 20% of the physical resources to process ASYNC IOs, and 10% of the physical resources to process ADP IOs.

In some implementations, the IO workload selection and prioritization process 300 initiates a certain type of IO based on available weights and will use ordered IO workflow processing, in which IOs of each type of IO workload are processed serially in groups, starting with SYNC IO workload, then proceeding to ASYNC IO workload, and then processing ADP workload. As long as the SYNC workload weight is positive and there are SYNC IOs to process, the IO workload selection and prioritization process 300 will only start processing SYNC IOs. On starting one SYNC IO, the IO workload selection and prioritization process 300 will decrement the weights for the SYNC workload. SYNC IOs will continue to be started while the SYNC weight is non-zero. Once the SYNC weight has become zero, the IO workload selection and prioritization process 300 will start processing ASYNC IOs, decrementing the ASYNC weight for each ASYNC IO that is processed. Once the ASYNC IO weight has become zero, the IO workload selection and prioritization process 300 will start processing ADP IOs. When all weights for all workloads have become zero, the weights are re-initialized for a new iteration. During each iteration the IO workload selection and prioritization process 300 will process each type of IO workload. At the end of the iteration, new weights are calculated and used in the subsequent iteration to select workload during that subsequent iteration.

As noted above, ADP IOs tend to be larger than SYNC IOs. For example, in a storage system that has a maximum data transmission unit size of 128 KB, the ADP IOs tend to be the maximum data transfer size, whereas the SYNC IOs may be significantly smaller. In one implementation, weights are periodically adjusted based on the average IO size for the SYNC IOs that were recently processed. In some implementations the weights are adjusted each iteration based on the average size of the SYNC IOs that were recently processed. For example, IO workload selection and prioritization process 300 may look at the average IO size for SYNC IOs over the preceding one second. This average IO size is used to set the SYNC weight for the next iteration to enable SYNC IOs to occupy the predetermined ratio.

As shown in FIG. 3, in some implementations at the start of an iteration, the IO workload selection and prioritization process 300 determines whether there is a SYNC IO to be processed 305. If there is a SYNC IO to be processed (Yes at block 305), the IO workload selection and prioritization process 300 will determine whether the SYNC weight is greater than zero 310. If the SYNC weight is greater than zero (Yes at block 310), the IO workload selection and prioritization process 300 will select one of the SYNC IOs to be processed 315 and will decrement the SYNC IO weight 320. The process will then return to block 305 and iterate until there is no more SYNC IOs to be processed (No at block 305) or the SYNC IO weight has reached zero (No at block 310).

Decrementing the SYNC IO weight may be implemented, for example, by subtracting a particular number from the SYNC IO weight. In some implementations the same amount is decremented from the SYNC IO weight for each IO that is processed regardless of the size of the SYNC IO.

The IO workload selection and prioritization process 300 will then start processing ASYNC IOs. As shown in FIG. 3, in some implementations the IO workload selection and prioritization process 300 determines whether there is an ASYNC IO to be processed 325. If there is an ASYNC IO to be processed (Yes at block 325), the IO workload selection and prioritization process 300 will determine whether the ASYNC weight is greater than zero 330. If the ASYNC weight is greater than zero (Yes at block 330), the IO workload selection and prioritization process 300 will select one of the ASYNC IOs to be processed 335 and will decrement the ASYNC IO weight 340. The process will then return to block 325 and iterate until there is no more ASYNC IOs to be processed (No at block 325) or the ASYNC IO weight has reached zero (No at block 330).

Decrementing the ASYNC IO weight may be implemented, for example, by subtracting a particular number from the ASYNC IO weight. In some implementations the same amount is decremented from the ASYNC IO weight for each IO that is processed regardless of the size of the ASYNC IO.

The IO workload selection and prioritization process 300 will then start processing ADP IOs. As shown in FIG. 3, in some implementations the IO workload selection and prioritization process 300 determines whether there is an ADP IO to be processed 345. If there is an ADP IO to be processed (Yes at block 345), the IO workload selection and prioritization process 300 will determine whether the ADP weight is greater than zero 350. If the ADP weight is greater than zero (Yes at block 350), the IO workload selection and prioritization process 300 will select one of the ADP IOs to be processed 355 and will decrement the ADP IO weight 360. The process will then return to block 345 and iterate until there is no more ADP IOs to be processed (No at block 345) or the ADP IO weight has reached zero (No at block 350).

Decrementing the ADP IO weight may be implemented, for example, by subtracting a particular number from the ADP IO weight. In some implementations the same amount is decremented from the ADP IO weight for each 10 that is processed regardless of the size of the ADP IO.

When the IO workload selection and prioritization process 300 has completed processing ADP IOs, it will set the weight or IO increment values for the next iteration 365, and return to block 305 and start another iteration of the IO workload selection and prioritization process 300. To enable the IO workload selection and prioritization process 300 to accommodate SYNC IOs of different sizes, in one implementation, at block 365, the IO workload selection and prioritization process 300 sets the weight to be used to process SYNC IOs based on the average size of the SYNC IOs during a preceding time interval. For example, the IO workload selection and prioritization process 300 may calculate an average size of the SYNC IOs processed during a preceding time interval, such as a preceding 1 second time interval, and use that average value to calculate a weight to be used for the SYNC IOs during the next iteration of the IO workload selection and prioritization process 300. The preceding time interval may correspond with the previous iteration or may span multiple iterations. For example, in an implementation where a processing iteration of the IO workload selection and prioritization process 300 is on the order of 0.1 seconds, and the preceding time interval used to determine SYNC IO weights is one second, the average SYNC IO size would be calculated based on the average SYNC IO size of all SYNC IOs processed during the preceding 10 iterations.

In some implementations the average IO size is compared with the maximum data transmission unit size, and the ratio is used to set the weight for the SYNC IO processing during the next iteration. For example, in some implementations the weight may be set as:

$$W(SYNC) = SYNC\ Work\ Ratio \cdot Iteration\ Size \cdot (Max\ TU/IO\ Average),$$

where:
W(SYNC) is the weight to be used for processing SYNC IOs during the next upcoming iteration;
SYNC Work Ratio is the percentage of the physical resources to be allocated to processing SYNC IOs based on the priority value for processing SYNC IOs.
Iteration Size is a value that relates to the overall nominal amount of IO workload that should be handled by the IO workload selection and prioritization process 300 during each iteration
MAX TU is the maximum data transmission unit size; and
IO Average is the average size of the SYNC IOs over the preceding time interval.

For example, assume that in one implementation the IO workload selection and prioritization process 300 was instructed to use a priority value of 70% for SYNC IOs, such that 70% of the resources were to be used to process SYNC IOs (SYNC Work Ratio=0.7). In this example, it also will be assumed that the iteration size is 100 units, that the MAX TU is 128 KB, and that the IO Average of SYNC IOs over the preceding time interval was 2 KB. Using the above equation, the weight to be used to process SYNC IOs during the next iteration will be:

$$W(SYNC) = 0.7 \cdot 100 \cdot (128/2) = 4480$$

Accordingly, during the next iteration, the IO workload selection and prioritization process 300 will process 4480 SYNC IOs. An assumption is that the SYNC IOs will collectively have an average size that is similar to the SYNC IO average size that was measured over the preceding time interval. Where the SYNC IO average size is increasing, the SYNC IO weight will tend to decrease over time and, where the SYNC 10 average size is decreasing the SYNC IO weight will tend to increase over time.

Although an example was provided in which the weight for SYNC IOs was calculated, the same formula may be applied to ASYNC IOs and ADP IOs. Specifically, assume that both ASYNC IOs and ADP IOs are always transmitted at the maximum data transmission unit size. Accordingly, in an implementation where the maximum data transmission unit size is 128 KB, the IO Average for both ASYNC IOs and ADP IOs will be equal to 128 KB. Using the above equation, assuming priority values of 20% for ASYNC workload and 10% for ADP workload, the ASYNC and ADP weights to be used during the next iteration will be:

$$W(ASYNC) = 0.2 \cdot 100 \cdot (128/128) = 20$$

$$W(ADP) = 0.1 \cdot 100 \cdot (128/128) = 10$$

Using these weights in an iteration will cause the IO workload selection and prioritization process 300 to process 4480 SYNC IOs. If each SYNC IO is 2 KB, a total of 8960 KB of SYNC IOs will be processed in the iteration. Likewise, the IO workload selection and prioritization process 300 will process 20 ASYNC IOs. If each ASYNC IO is 128 KB, a total of 2560 KB of ASYNC IOs will be processed in the iteration. Likewise, the IO workload selection and prioritization process 300 will process 10 ADP IOs. If each ADP IO is 128 KB, a total of 1280 KB of ADP IOs will be processed in the iteration. As is clear, this results in a ratio of 70% SYNC, 20% ASYNC, and 20% ADP.

Figure 5A:
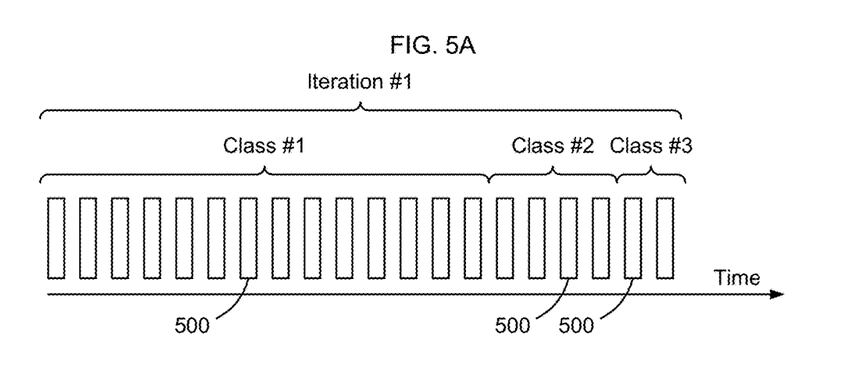
FIGS. 5A and 5B are graphs showing the selection of IO workload for three classes of traffic with variable IO size according to an embodiment.
Figure 5B:
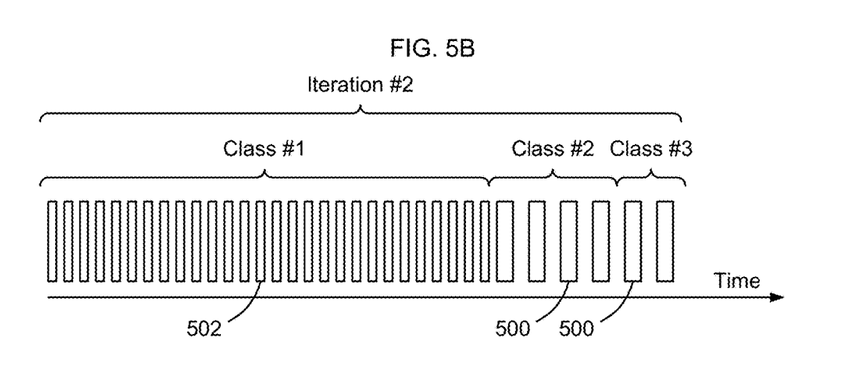

FIGS. 5A and 5B visually depict two example iterations where different classes of traffic have variable sized 10 events. For example, FIG. 5A shows a first iteration where all classes of traffic are handling IOs of equal size. During the first iteration, the IO workload selection and prioritization process 300 will process 14 IOs 500 from Class #1, 4 IOs from class #2, and 2 IOs from class #3, to achieve 70%, 20%, 10% workload distribution between the classes. FIG. 5B shows a second iteration where the IOs of the first class of traffic are half the size of the IOs of the second and third traffic classes. During the second iteration, the IO workload selection and prioritization process 300 will process 28 smaller IOs 502 from Class #1, 4 IOs 500 from class #2, and 2 IOs 500 from class #3, to achieve 70%, 20%, 10% workload distribution between the classes.

Although in the examples it was assumed that the ASYNC and ADP IOs both had average IO sizes over the preceding interval that was equal to the maximum data transmission unit size, in some embodiments the average of the ASYNC IOs and the average of the ADP IOs may be calculated and the above equation may be used to adjust the weights used by the IO workload selection and prioritization process 300 for each type of workload.

There are instances where the IO workload selection and prioritization process 300 may transition from processing a first type of IO workload to a second type of IO workload without having the weight for the first type of IO workload reach zero. For example, in FIG. 3 if the process does not have any SYNC IOs to process (No at block 305), but the SYNC weight is greater than zero, the IO workload selection and prioritization process 300 will start processing ASYNC IOs 325. In some implementations, if a SYNC IO is subsequently received, the IO workload selection and prioritization process 300 will revert back to processing SYNC IOs until reaching a no decision at block 305 or block 310. Similarly, if the IO workload selection and prioritization process 300 runs out of ASYNC IOs before the ASYNC weight reaches zero (no at block 325), it will start processing ADP IOs. If an ASYNC IO or a SYNC IO arrives while processing ADP IOs, the IO workload selection and prioritization process 300 will revert to preferentially processing those higher priority IOs so long as the weight for that IO class has not reached zero.

Figure 4:
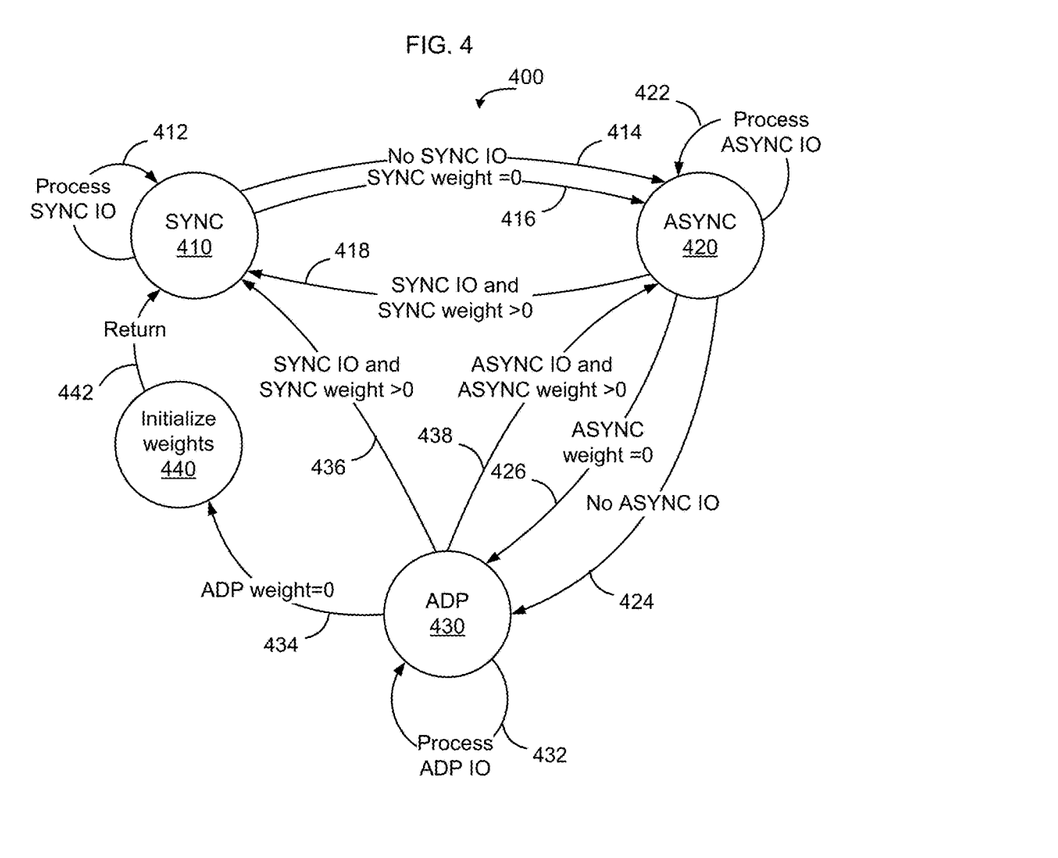
FIG. 4 is a state diagram of the example method of FIG. 3 according to an embodiment.

To illustrate this process, FIG. 4 shows a state diagram 400 of the IO workload selection and prioritization process 300. As shown in FIG. 4, in some implementations the IO workload selection and prioritization process 300 operates in one of four states: a first state 410 in which SYNC IOs are processed, a second state 420 in which ASYNC IOs are processed, a third state 430 in which ADP IOs are processed, and a fourth state 440 in which weights are initialized for an upcoming iteration of execution of the IO workload selection and prioritization process 300.

When the IO workload selection and prioritization process 300 is in the first state 410, the IO workload selection and prioritization process 300 will process SYNC IOs 412 while there are SYNC IOs available to be processed and the SYNC IO weight is greater than zero. If there are no SYNC IOs to process 414 or the SYNC weight equals zero 416, the IO workload selection and prioritization process 300 will transfer to the second state 420.

When the IO workload selection and prioritization process 300 is in the second state 420, the IO workload selection and prioritization process 300 will process ASYNC IOs 422 while there are ASYNC IOs available to be processed and the ASYNC IO weight is greater than zero. If there are no ASYNC IOs to process 424 or the ASYNC weight equals zero 426, the IO workload selection and prioritization process 300 will transfer to the third state 430.

When the IO workload selection and prioritization process 300 is in the third state 430, the IO workload selection and prioritization process 300 will process ADP IOs 432 while there are ADP IOs available to be processed and the ADP IO weight is greater than zero. If there are no ADP IOs, the IO workload selection and prioritization process 300 will stay in the third state 430 and wait for arrival of additional ADI IOs until the ADP weight equals zero 434. When the ADP weight equals zero 434, the IO workload selection and prioritization process 300 will transfer to the fourth state 440.

If a SYNC IO arrives while the IO workload selection and prioritization process 300 is in the second state 420, if the SYNC IO weight is greater than zero 418 the IO workload selection and prioritization process 300 will transfer back to the first state 410 and process SYNC IOs as described above. When there is no additional SYNC IOs 414 or the SYNC IO weight reaches zero 416 the IO workload selection and prioritization process 300 will transition to the second state 420 to continue processing ASYNC IOs. The process of transferring state between the first state 410 and second state may happen several times during an iteration depending on the timing of arrival of SYNC IOs.

If a SYNC IO arrives while the IO workload selection and prioritization process 300 is in the third state 430, if the SYNC IO weight is greater than zero 436 the IO workload selection and prioritization process 300 will transfer back to the first state 410 and process SYNC IOs as described above. When there is no additional SYNC IOs 414 or the SYNC IO weight reaches zero 416 the IO workload selection and prioritization process 300 will transition to the second state 420 and from the second state to the third state as described above.

If an ASYNC IO arrives while the IO workload selection and prioritization process 300 is in the third state 430, if the ASYNC IO weight is greater than zero 438 the IO workload selection and prioritization process 300 will transfer back to the second state 420 and process ASYNC IOs as described above. When there is no additional ASYNC IOs 424 or the ASYNC IO weight reaches zero 426 the IO workload selection and prioritization process 300 will transition to the third state 430 and continue to process ADP IOs. The process of transferring state between the third state 430 and first state 410 or second state 420 may happen several times during an iteration depending on the timing of arrival of SYNC and ASYNC IOs.

When the IO workload selection and prioritization process 300 is in the fourth state 440, the IO workload selection and prioritization process 300 will initialize weights for a subsequent iteration of IO processing of the IO workload selection and prioritization process 300. The IO workload selection and prioritization process 300 will then return 442 to the first state 410. The IO workload selection and prioritization process 300 will cycle through the first 410, second 420, and third states 430 during each iteration to serially preferentially process SYNC IOs over ASYNC IOs, and preferentially process ASYNC IOs over ADP IOs.

By providing flexibility for the software to transition to a lower priority processing state when the higher priority processing state doesn't have sufficient work to use all allocated physical resources (transitions 414 and 424 that occur when weight for that state is greater than zero), the IO workload selection and prioritization process 300 ensures that the physical resources will always be put to full use. By providing flexibility for the software to transition back to a higher priority processing state when additional work for the higher priority processing state is subsequently received (transitions 418, 436, and 438), the IO workload selection and prioritization process 300 ensures that each work type is ensured the ability to fully consume all of its allocated processing resources regardless of when the workload arrives during the iteration.

A simulation was performed to compare an ordered IO workflow process, as described above in connection with the IO workload selection and prioritization process 300, with a randomized interleaved IO workflow process, in which workloads of different types were selected to be processed such that SYNC, ASYNC, and ADP IO workloads were mixed together.

Figure 6A:
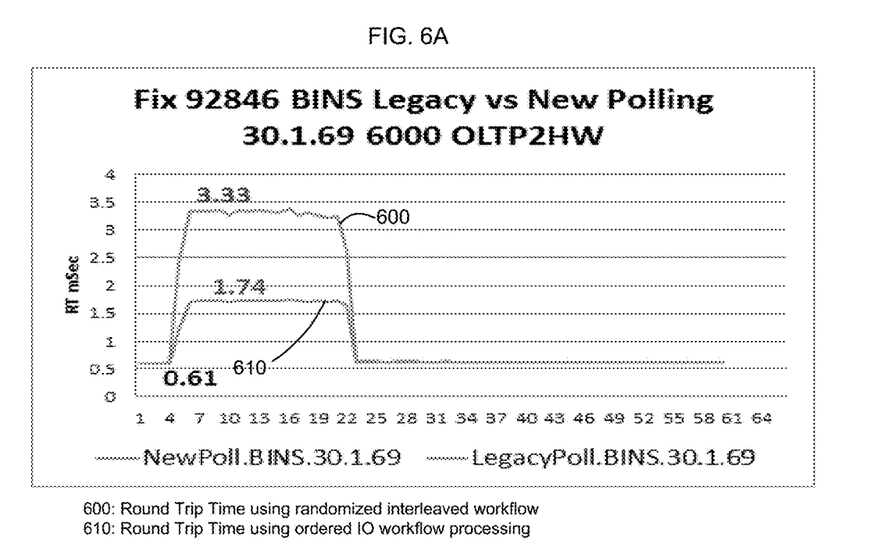
FIGS. 6A and 6B are graphs showing a comparison between two methods of IO workload selection and prioritization in a data mirroring environment in which a first method uses randomized interleaved workflow IO selection and a second method uses ordered IO workflow processing according to an embodiment.
Figure 6B:
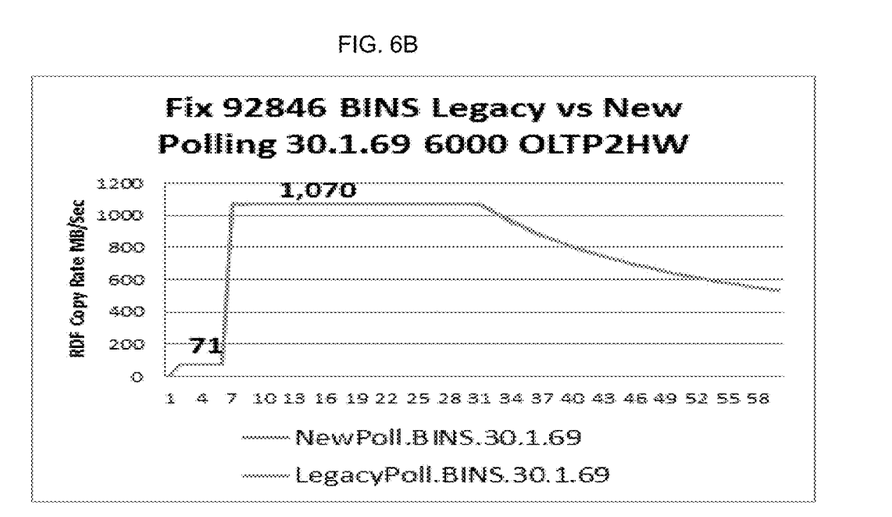

FIGS. 6A and 6B are graphs showing a comparison between two methods of IO workload selection and prioritization in a data mirroring environment in which a first method uses randomized interleaved workflow 10 selection and a second method uses ordered IO workflow processing according to the method described in greater detail herein. In FIGS. 6A and 6B, the simulation was performed using SYNC IOs having a size of 6 KB and ASYNC and ADP IOs of 128 KB.

Line 600, in FIG. 6A, shows the measured round-trip time for a method that uses randomized interleaved workflow IO selection. The term "randomized interleaved workflow" means that the method used to select IOs to be processed will randomly or programmatically select IOs from SYNC, ASYNC, and ADP such that there is a mixture of IOs of the various types that are processed in sequence. For example, a randomized interleaved workflow IO selection may process 1 SYNC, 1 ADP, 2 SYNC, 1 ASYNC, etc., in no particular order, while still maintaining the 70%, 20%, 10% total resource allocation to the SYNC, ASYNC, and ADP workload priorities. As shown in FIG. 6A, the randomized interleaved workflow IO selection method exhibited a 3.33 mSec Round Trip Time.

Line 610, in FIG. 6A, shows the measured round-trip time for a method that uses an ordered IO workflow processing according to the method described in greater detail herein. The method described is referred to as "ordered" in that the method first processes all available IOs of a first type, then processes all available IOs of a second type, and then processes all available IOs of a third type, up to the allocated 70%, 20%, 10% total resource allocation. The details of this "ordered" IO workflow processing method are described above in connection with FIGS. 3 and 4. As shown in FIG. 6B, the method described herein exhibited a 1.74 mSec Round Trip Time, which is a 48% improvement over the previous method. Thus, the IO workload selection and prioritization process 300 described herein significantly improves the functioning of the storage system when operating in a data mirroring environment.

FIG. 6B shows simulation results and show the RDF copy rate of both methods, in MB/second. In FIG. 6B, both the randomized interleaved workflow IO selection method and the IO workload selection and prioritization process 300 described herein showed the same RDF copy rate profile. Hence, the simulation results shown in FIG. 6B shows a single trace, since the simulation results were sufficiently close to not enable the two lines of the two methods to be discernable within the graph of FIG. 6B.

Although an example was provided in which the IO workload selection and prioritization process 300 was used to select and prioritize IO workloads of three different types, it should be understood that the method equally can apply to N types of workloads, where N is greater than or equal to two. Accordingly, different implementations may be used to select and prioritize between two, three, four, or more types of IO workloads in data mirroring environments.

While the invention is described through the above exemplary embodiments, it will be understood by those of ordinary skill in the art that modification to and variation of the illustrated embodiments may be made without departing from the inventive concepts herein disclosed. Moreover, while the embodiments are described in connection with various illustrative structures, one skilled in the art will recognize that the system may be embodied using a variety of specific structures. Accordingly, the invention should not be viewed as limited except by the scope and spirit of the appended claims.

The methods described herein may be implemented as software configured to be executed in control logic such as contained in a CPU of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of IO workload selection and prioritization in data mirroring environments, the computer program including a set of instructions which, when executed by a computer, cause the computer to perform a method comprising the steps of:
    setting a first weight, a second weight, and a third weight to be used during an iteration of IO processing, the first weight, second weight, and third weight specifying numbers of IO operations to be processed for each of three classes of IO operations;
    processing IOs of a first class of IO operations while there are IOs of the first class of IO operations to be processed and while a first weight for the first class of IO operations is positive;
    processing IOs of a second class of IO operations while there are IOs of the second class of IO operations to be processed and while a second weight for the second class of IO operations is positive;
    processing IOs of a third class of IO operations while there are IOs of the third class of IO operations to be processed and while a third weight for the third class of IO operations is positive; and
    iterating the steps of setting first, second, and third weights, processing IOs of the first class, processing IOs of the second class, and processing IOs of the third class.

2. The non-transitory tangible computer readable storage medium of claim 1, wherein the step of setting the first weight comprises determining an average size of the IOs of the first class of IO operations processed during a preceding predetermined time interval, and using the average size to specify the number of IOs of the first class of IO operations to be processed during the step of processing IOs of the first class of IO operations during a subsequent processing iteration.

3. The non-transitory tangible computer readable storage medium of claim 1, further comprising commencing the step of processing IOs of the second class of IO operations if there are no additional IOs of the first class of IOs to be processed and the first weight for the first class of IO operations is positive.

4. The non-transitory tangible computer readable storage medium of claim 3, further comprising returning to the step of processing IOs of the first class of IO operations if an additional IO of the first class of IOs is received while processing IOs of the second class of IO operations only if the first weight for the first class of IO operations is positive.

5. The non-transitory tangible computer readable storage medium of claim 1, further comprising commencing the step of processing IOs of the third class of IO operations if there are no additional IOs of the second class of IOs to be processed and the second weight for the second class of IO operations is positive.

6. The non-transitory tangible computer readable storage medium of claim 5, further comprising returning to the step of processing IOs of the first class of IO operations if an additional IO of the first class of IOs is received while processing IOs of the third class of IO operations only if the first weight for the first class of IO operations is positive.

7. The non-transitory tangible computer readable storage medium of claim 5, further comprising returning to the step of processing IOs of the second class of IO operations if an additional IO of the second class of IOs is received while processing IOs of the third class of IO operations only if the second weight for the second class of IO operations is positive.

8. The non-transitory tangible computer readable storage medium of claim 1, wherein IOs of the first class of IO operations are SYNC IOs associated with data mirroring in a synchronous data mirroring mode.

9. The non-transitory tangible computer readable storage medium of claim 8, wherein the synchronous data mirroring mode requires acknowledgement of a successful write to be transmitted from a receiving storage element in the mirroring environment synchronously with the completion of the IO operation.

10. The non-transitory tangible computer readable storage medium of claim 1, wherein IOs of the second class of IO operations are ASYNC IOs associated with data mirroring in an asynchronous data mirroring mode.

11. The non-transitory tangible computer readable storage medium of claim 10, wherein the asynchronous data mirroring mode enables completion of the IO operation to occur prior to receiving acknowledgement of a successful write by a receiving storage element in the mirroring environment.

12. The non-transitory tangible computer readable storage medium of claim 1, wherein IOs of the third class of IO operations are ADP IOs associated with data mirroring in an adaptive copy data mirroring mode.

13. The non-transitory tangible computer readable storage medium of claim 1, wherein the adaptive copy data mirroring mode enables IO operations to occur locally and be accumulated in cache for subsequent transmission to a receiving storage element in the mirroring environment.

14. A storage environment, comprising:
a primary storage device; and
a plurality of secondary storage devices configured to implement a plurality of remote data facilities with the primary storage device;
wherein the primary storage device contains control logic, which when executed on a processor, cause the processor to implement a method of IO workload selection and prioritization for transmission of data on the remote data facilities, the method including the steps of:
setting a first weight, a second weight, and a third weight to be used during an iteration of IO processing, the first weight, second weight, and third weight specifying numbers of IO operations to be processed for each of three classes of IO operations;
processing IOs of a first class of IO operations while there are IOs of the first class of IO operations to be processed and while a first weight for the first class of IO operations is positive;
processing IOs of a second class of IO operations while there are IOs of the second class of IO operations to be processed and while a second weight for the second class of IO operations is positive;
processing IOs of a third class of IO operations while there are IOs of the third class of IO operations to be processed and while a third weight for the third class of IO operations is positive; and
iterating the steps of setting first, second, and third weights, processing IOs of the first class, processing IOs of the second class, and processing IOs of the third class.

15. The storage environment of claim 14, wherein the method further comprises determining an average size of the IOs of the first class of IO operations processed during a preceding predetermined time interval, and using the average size to specify the number of IOs of the first class of IO operations to be processed during the step of processing IOs of the first class of IO operations during a subsequent processing iteration.

16. The storage environment of claim 14, wherein the method further comprises the steps of:
commencing the step of processing IOs of the second class of IO operations if there are no additional IOs of the first class of IOs to be processed and the first weight for the first class of IO operations is positive; and
returning to the step of processing IOs of the first class of IO operations if an additional IO of the first class of IOs is received while processing IOs of the second class of IO operations only if the first weight for the first class of IO operations is positive.

17. The storage environment of claim 14, wherein the method further comprises the steps of:
commencing the step of processing IOs of the third class of IO operations if there are no additional IOs of the second class of IOs to be processed and the second weight for the second class of IO operations is positive; and
returning to the step of processing IOs of the first class of IO operations if an additional IO of the first class of IOs is received while processing IOs of the third class of IO operations only if the first weight for the first class of IO operations is positive.

18. The storage environment of claim 14, wherein IOs of the first class of IO operations are SYNC IOs associated with data mirroring in a synchronous data mirroring mode; and
wherein IOs of the second class of IO operations are ASYNC IOs associated with data mirroring in an asynchronous data mirroring mode.

19. The storage environment of claim 18, wherein the synchronous data mirroring mode requires acknowledgement of a successful write to be transmitted from a receiving storage element in the mirroring environment synchronously with the completion of the IO operation; and wherein the asynchronous data mirroring mode enables completion of the IO operation to occur prior to receiving acknowledgement of a successful write by a receiving storage element in the mirroring environment.

* * * * *